(12) United States Patent
Kim

(10) Patent No.: US 7,761,806 B2
(45) Date of Patent: Jul. 20, 2010

(54) MOBILE COMMUNICATION DEVICE AND METHOD OF CONTROLLING OPERATION OF THE MOBILE COMMUNICATION DEVICE

(75) Inventor: Tae Hun Kim, Icheon-si (KR)

(73) Assignee: LG Electronics Inc., Seoul (KR)

( * ) Notice: Subject to any disclaimer, the term of this patent is extended or adjusted under 35 U.S.C. 154(b) by 377 days.

(21) Appl. No.: 11/783,247

(22) Filed: Apr. 6, 2007

(65) Prior Publication Data

US 2008/0189657 A1 Aug. 7, 2008

(30) Foreign Application Priority Data

Feb. 3, 2007 (KR) .................. 10-2007-0011292

(51) Int. Cl.
*G06F 3/00* (2006.01)
*G06F 3/048* (2006.01)

(52) U.S. Cl. .................. 715/784; 715/810; 345/173

(58) Field of Classification Search ................ 715/764, 715/765, 781, 784, 786, 810; 345/156, 173
See application file for complete search history.

(56) References Cited

U.S. PATENT DOCUMENTS

| | | | | |
|---|---|---|---|---|
| 5,764,218 A * | 6/1998 | Della Bona et al. | ......... | 345/157 |
| 6,489,951 B1 | 12/2002 | Wong et al. | | |
| 6,545,669 B1 * | 4/2003 | Kinawi et al. | ................ | 345/173 |
| 7,515,142 B2 * | 4/2009 | Park | ............................ | 345/173 |
| 2006/0026535 A1 * | 2/2006 | Hotelling et al. | ............ | 715/863 |
| 2006/0187212 A1 * | 8/2006 | Park et al. | .................... | 345/169 |
| 2007/0024595 A1 * | 2/2007 | Baker et al. | .................. | 345/173 |
| 2007/0154722 A1 * | 7/2007 | Abel et al. | ............... | 428/423.1 |
| 2007/0168890 A1 * | 7/2007 | Zhao et al. | .................. | 715/863 |
| 2007/0247436 A1 * | 10/2007 | Jacobsen | .................... | 345/173 |
| 2007/0257891 A1 * | 11/2007 | Esenther et al. | ............. | 345/173 |
| 2007/0262951 A1 * | 11/2007 | Huie et al. | ................... | 345/156 |
| 2008/0036743 A1 * | 2/2008 | Westerman et al. | ......... | 345/173 |
| 2008/0094369 A1 * | 4/2008 | Ganatra et al. | ............... | 345/173 |
| 2008/0109750 A1 * | 5/2008 | Lin-Hendel | ................... | 715/785 |
| 2008/0165141 A1 * | 7/2008 | Christie | .................... | 345/173 |
| 2009/0058830 A1 * | 3/2009 | Herz et al. | .................. | 345/173 |

FOREIGN PATENT DOCUMENTS

| | | |
|---|---|---|
| JP | 11-154075 A | 6/1999 |
| JP | 2003-330613 A | 11/2003 |

* cited by examiner

*Primary Examiner*—X. L Bautista
(74) *Attorney, Agent, or Firm*—Birch, Stewart, Kolasch & Birch, LLP

(57) ABSTRACT

A method of controlling a mobile communication device, which includes displaying a menu list and a scroll bar for scrolling the menu list on a touch screen of the terminal, receiving a dragging signal if a dragging operation has been performed from the scroll bar directly to the menu list, receiving a direction signal indicating a direction in which the dragging operation is performed within the menu list, and scrolling the menu list based on the received direction signal.

31 Claims, 8 Drawing Sheets

MOBILE COMMUNICATION DEVICE AND METHOD OF CONTROLLING OPERATION OF THE MOBILE COMMUNICATION DEVICE

CROSS-REFERENCE TO A RELATED APPLICATION

This application claims the benefit of Korean Application No. 2007-11292, filed on Feb. 3, 2007 in the Korean Intellectual Property Office, the disclosure of which is incorporated herein by reference.

BACKGROUND OF THE INVENTION

1. Field of the Invention

The present invention relates to a mobile communication device including a touch screen and method of operating the same in which a menu list is scrolled in response to the touch screen being touched.

2. Description of the Related Art

Various new technologies have been widely applied to mobile communication devices such as mobile phones or personal digital assistants (PDAs). For example, Phase change Random Access Memory (PRAM) chips are used as core chips in mobile communication devices. In addition, ultra high pixel Complementary Metal-Oxide Semiconductor (CMOS) chips are being used as camera modules included with the mobile devices. Touch screens and double-sided liquid crystal displays (LCD) are also being used as displays for the mobile communication devices.

However, because the mobile communication devices are compact and portable, the amount of area used for the displays is limited. Further, the mobile devices also include keypads allowing the user to input information into the device. The keypad further limits the space available for the display. This disadvantageously reduces the available size of the displays used in the mobile communication devices.

SUMMARY OF THE INVENTION

Accordingly, one object of the present invention is to address the above-noted and other problems.

Another object of the present invention is to provide a mobile communication device and method of operating the same in which a menu list can be scrolled by a user performing a specified touching operation on a touch screen included with the mobile communication device.

To achieve these and other advantages and in accordance with the purpose of the present invention, as embodied and broadly described herein, the present invention provides in one aspect a method of controlling a mobile communication device. The method includes displaying a menu list and a scroll bar for scrolling the menu list on a touch screen of the terminal, receiving a dragging signal if a dragging operation has been performed from the scroll bar directly to the menu list, receiving a direction signal indicating a direction in which the dragging operation is performed within the menu list, and scrolling the menu list based on the received direction signal. The present invention also provides a corresponding mobile communication device.

In another aspect, the present invention provides a method of controlling a mobile communication device, the method comprising displaying a menu list and a scroll bar for scrolling the menu list on a touch screen of the terminal, receiving a double touch signal indicating if a double touching operation has been performed on the touch screen in which the double touching operation includes the scroll bar being first touched and then the menu list being touched, receiving a direction signal indicating a direction in which a dragging operation is performed within the menu list, and scrolling the menu list based on the received direction signal. The present invention also provides a corresponding mobile communication device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
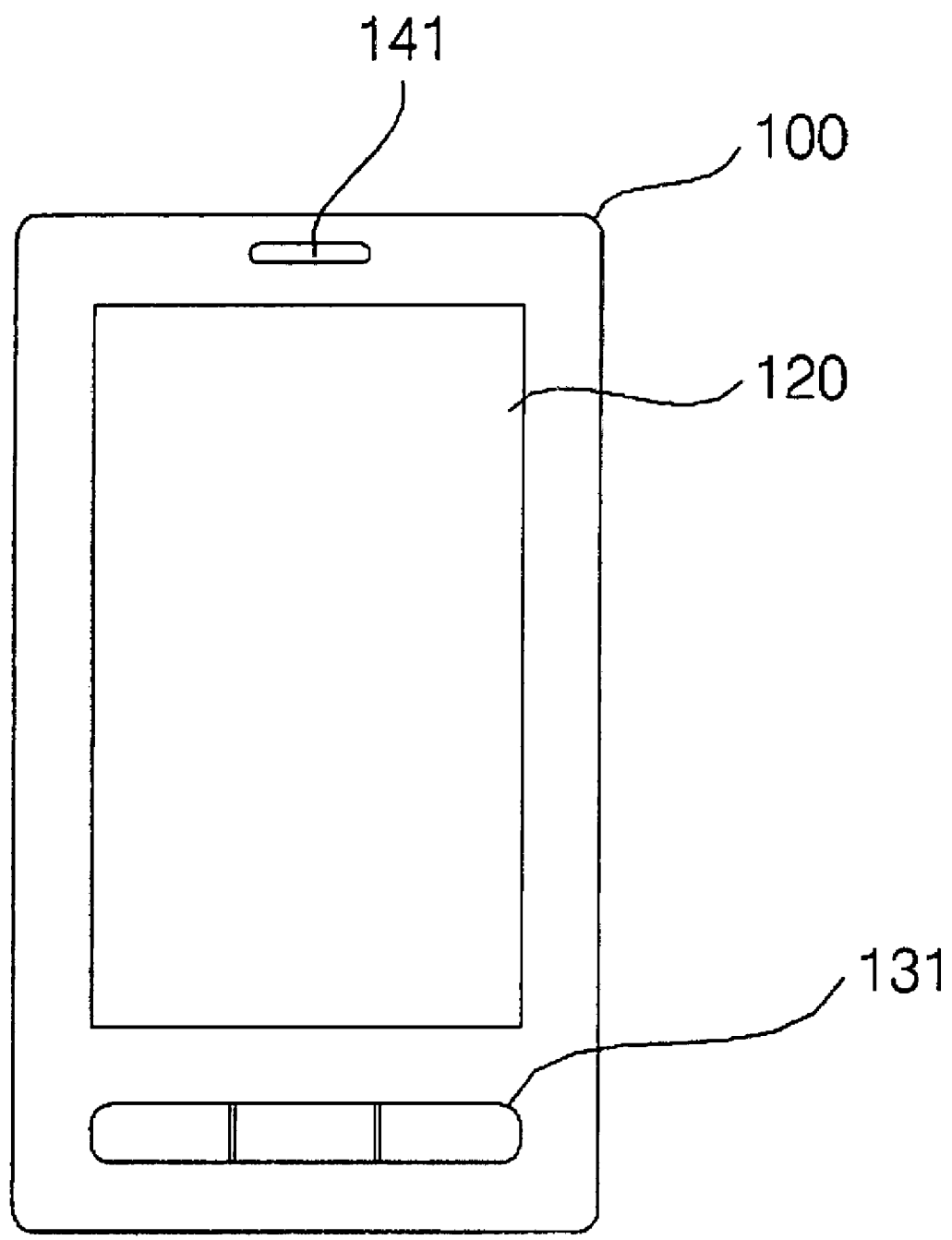
FIG. 1 is a front view of a mobile communication device according to an embodiment of the present invention.

Turning first to FIG. 1, which is a front view of a mobile communication device 100 according to an embodiment of the present invention. As shown, the mobile communication device 100 includes a speaker 141 disposed on a front surface of the device 100 for outputting a caller's voice during a phone conversation, for outputting music being played on the terminal, etc. The terminal 100 also includes a touch screen 120 that can be used as both an input device and a display device, and manipulation keys 131 which can be used to receive or terminate a call. The manipulation keys 133 can also be used to increase or decrease a volume level of the speaker 141, etc.

Figure 2:
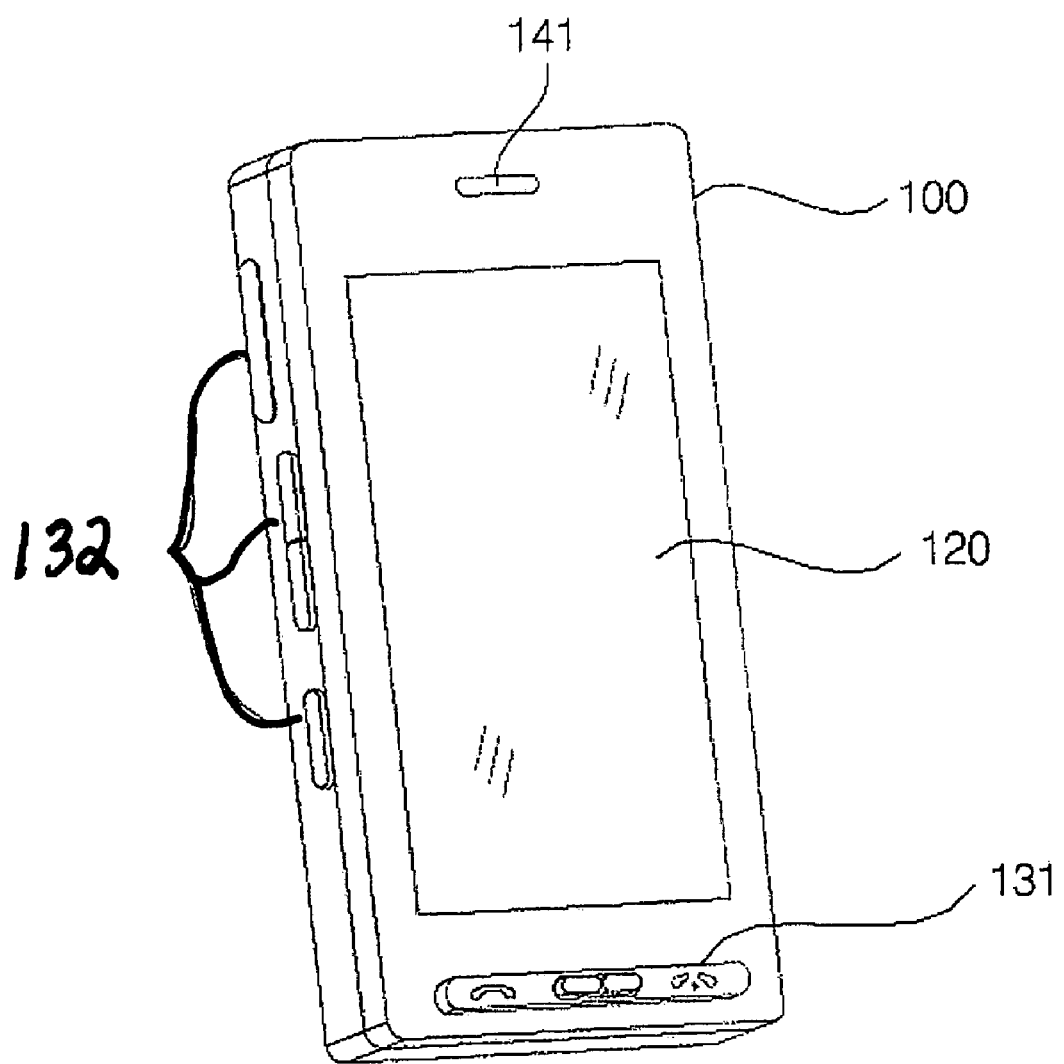
FIG. 2 is a perspective view illustrating the mobile communication device shown in FIG. 1 in more detail according to an embodiment of the present invention.

As shown in FIG. 2, side keys 132 may also be provided on the side of the terminal to perform camera functions and other related functions of the device 100. FIG. 2 also illustrates the manipulation keys 131 in greater detail (i.e., FIG. 2 illustrates the keys 131 including call connect and disconnect keys, etc.). In addition, the touch screen 120 is a display device, which responds to touch input from a user. More specifically, the touch screen 120 allows the user to interact with the mobile communication device 100 by touching pictures, characters or other information displayed on the touch screen 120.

Figure 3:
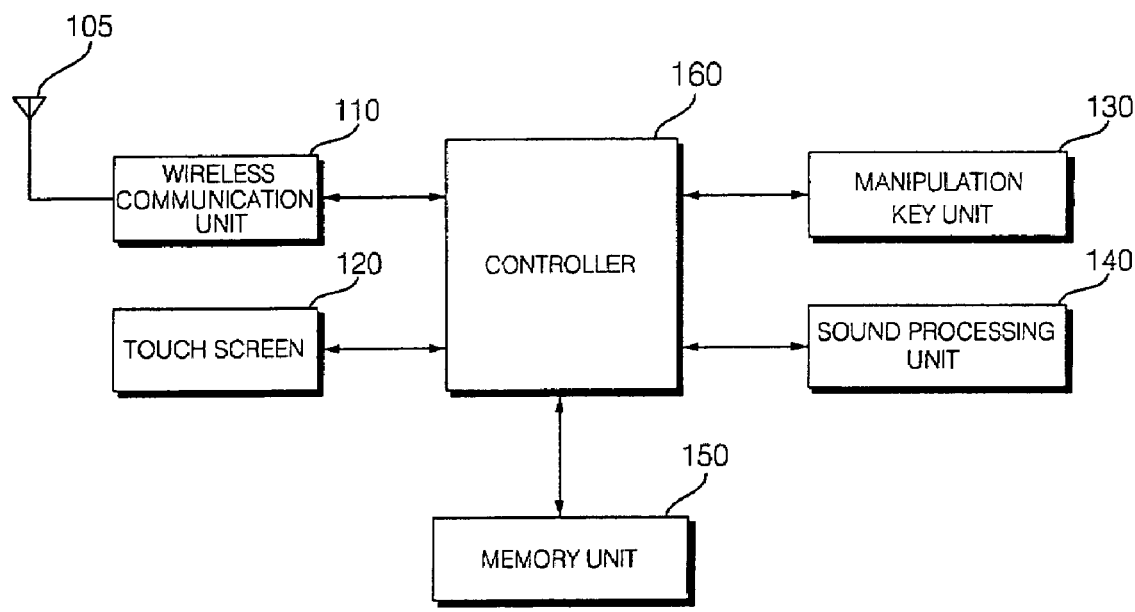
FIG. 3 is a block diagram of a mobile communication device according to an embodiment of the present invention.

Turning next to FIG. 3, which is a block diagram of the mobile communication device 100 shown in FIGS. 1 and 2 according to an embodiment of the present invention. As shown, the mobile communication device 100 includes a wireless communication unit 110, the touch screen 120, a manipulation key unit 130, a sound processing unit 140, a memory unit 150, and a controller 160. The wireless communication unit 110 provides an interface for wireless communication with a base station through an antenna 105. Further, the wireless communication unit 110 includes a duplex filter for filtering a signal received through the antenna 105, a power amplifier for amplifying a transmit signal, a frequency up-convert circuit in a transmission path, a frequency down-convert circuit in a reception path, etc.

In addition, the touch screen 120 serves as an input device for receiving user commands and data, and as a display device for displaying menus used for operating the mobile communication device and for displaying other information such as a state of a received call, battery information, etc. The touch screen 120 is also controlled by a corresponding touch screen panel controller (not shown) included within the controller 160. The touch screen 120 is a transparent panel attached onto the exterior of the mobile communication device and is connected to communication buses in the mobile communication device 100.

Further, the controller 160 determines whether the touch screen 120 has been touched and performs different functions according to where and the manner in which the touch screen 120 is touched. The manipulation key unit 130 also includes the keys 131 (shown in FIGS. 1 and 2) for making or receiving a call, for terminating a call, etc. The sound processing unit 140 amplifies a sound signal output by the controller 160 and outputs the amplified signal to the speaker 141. The sound processing unit 140 also converts a sound signal input via a microphone into an electrical signal and transmits the electrical signal to the controller 160.

In addition, the memory unit 150 stores programs and data used for operating the communication device and other various data that the user wishes to store. The memory unit 150 also stores a software driver for controlling the touch screen 120. Further, the controller 160 controls the overall operation of the mobile device by controlling the wireless communication unit 110, the touch screen 120, the manipulation key unit 130, the sound processing unit 140 and the memory unit 150. The controller 160 also displays a menu list and a scroll bar for scrolling the menu list on the touch screen 120 in response to a specific user input.

For example, the controller 160 can determine if a particular menu item displayed on the touch screen 120 is touched, if a dragging operation or double touching operation is performed on the touch screen 120, etc. For example, in one embodiment, the controller 160 displays a menu list and corresponding scroll bar on the touch screen 120. The controller 160 then determines if the user first touches the scroll bar and then drags his or her finger directly into the menu list to perform a scrolling operation. In another embodiment, the controller 160 determines if the user performs a double touching operation such as first touching the scroll bar and then separately touching the menu list to perform a scrolling operation. These features will be discussed in more detail later.

Figure 4:
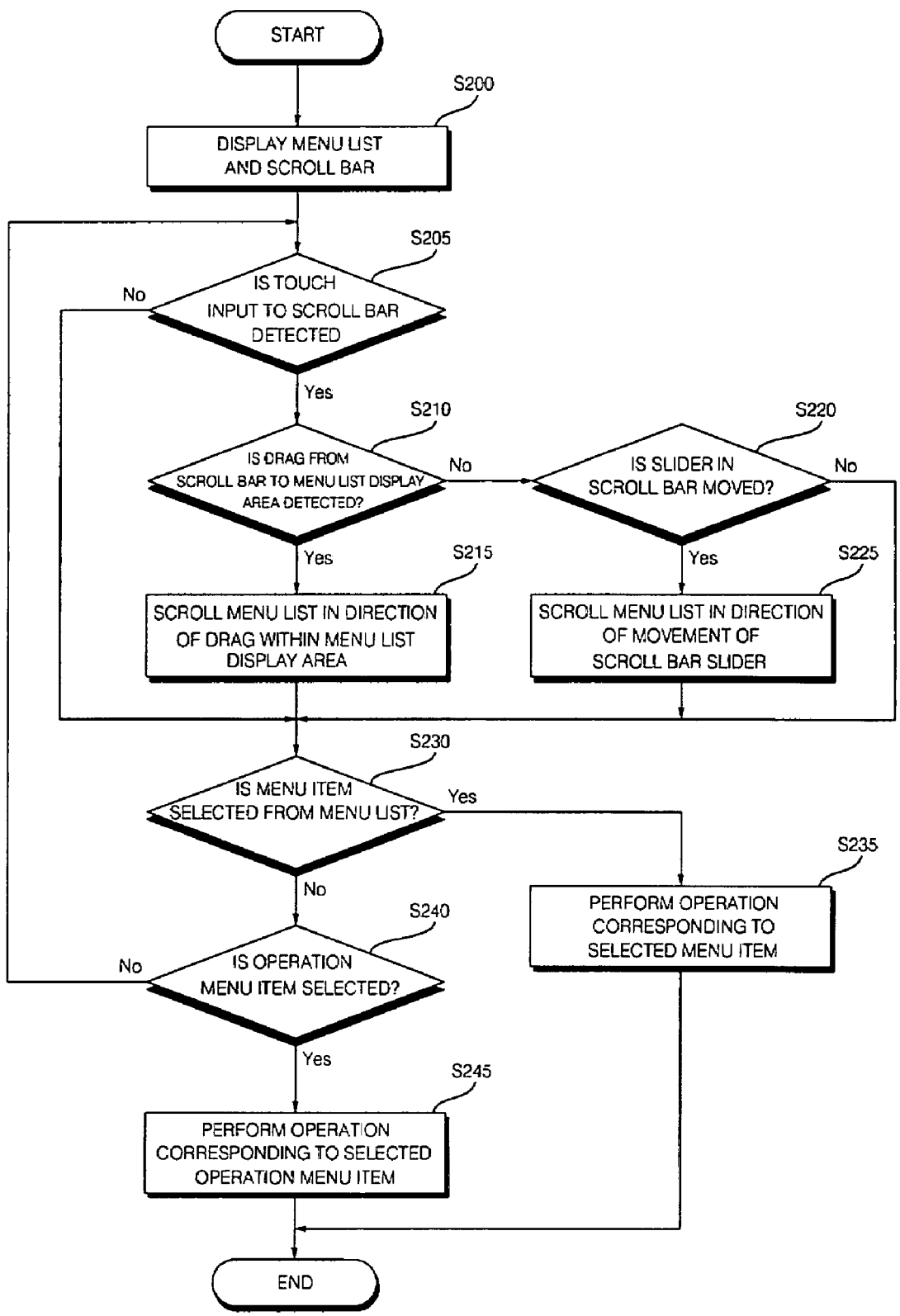
FIG. 4 is a flowchart illustrating a method of controlling an operation of a mobile communication device according to an embodiment of the present invention.
Figure 6:
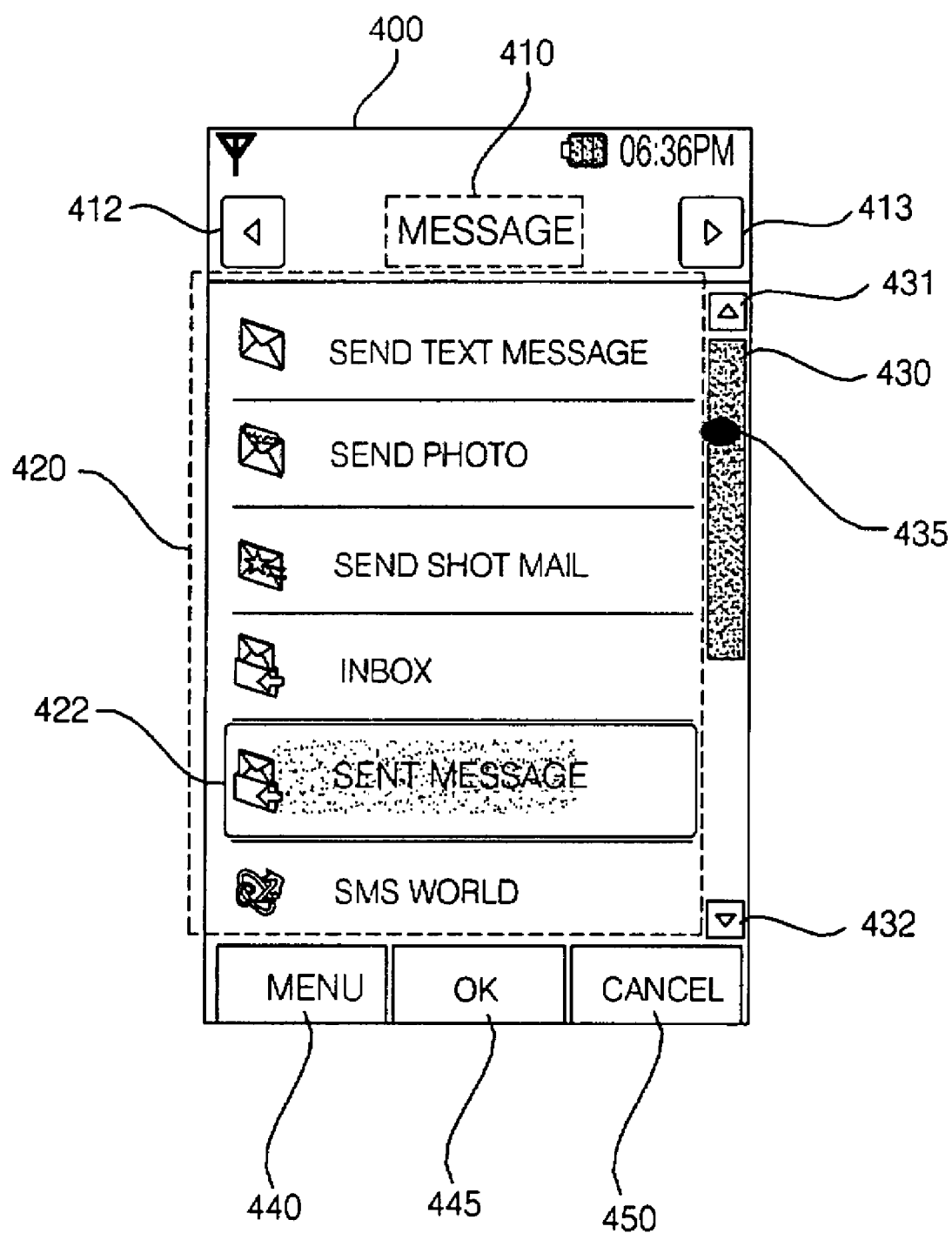
FIG. 6 is an overview illustrating a touch screen including a scroll bar and menu list according to an embodiment of the present invention.
Figure 7:
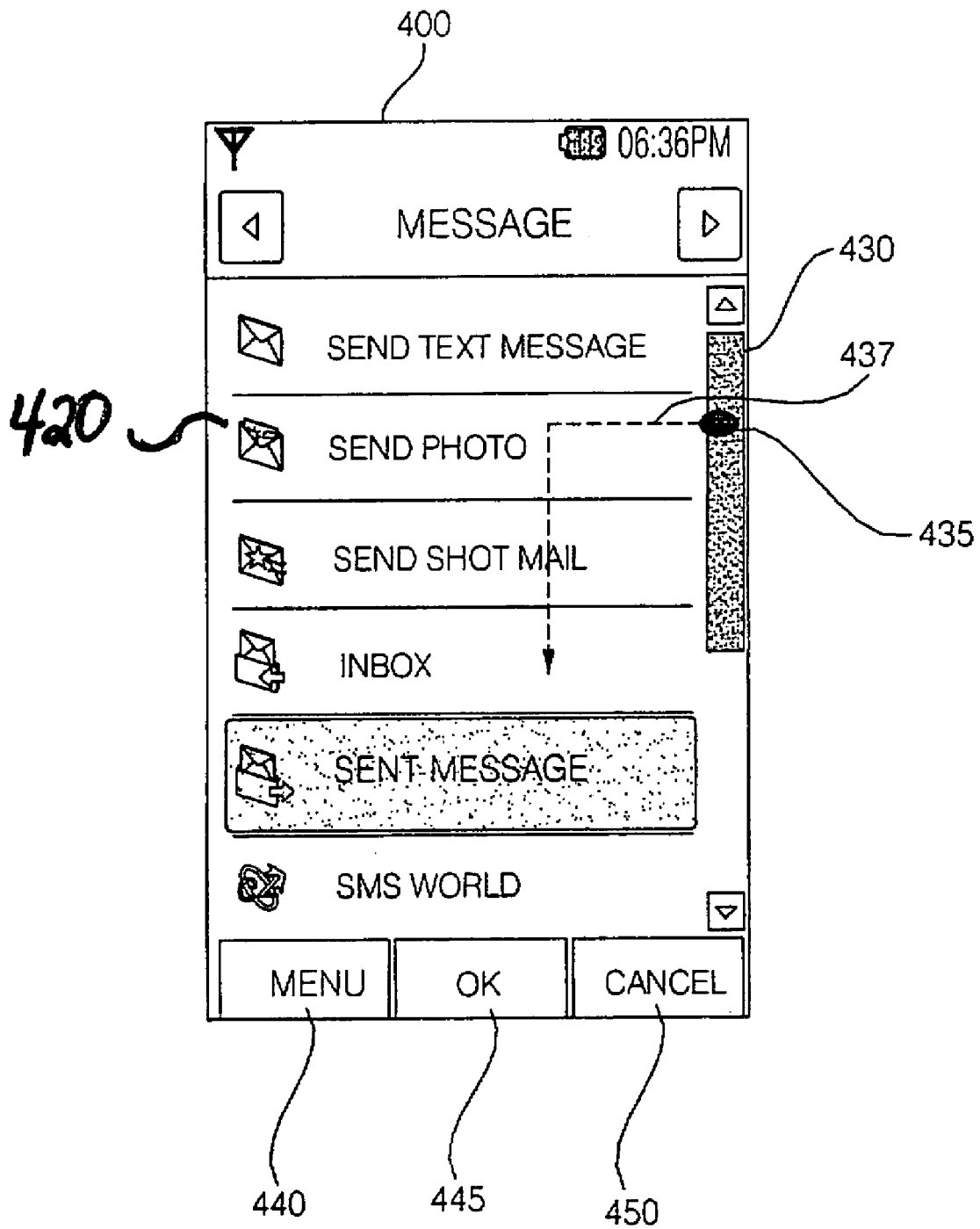
FIG. 7 is an overview illustrating a dragging operation being performed on the touch screen according to an embodiment of the present invention.
Figure 8:
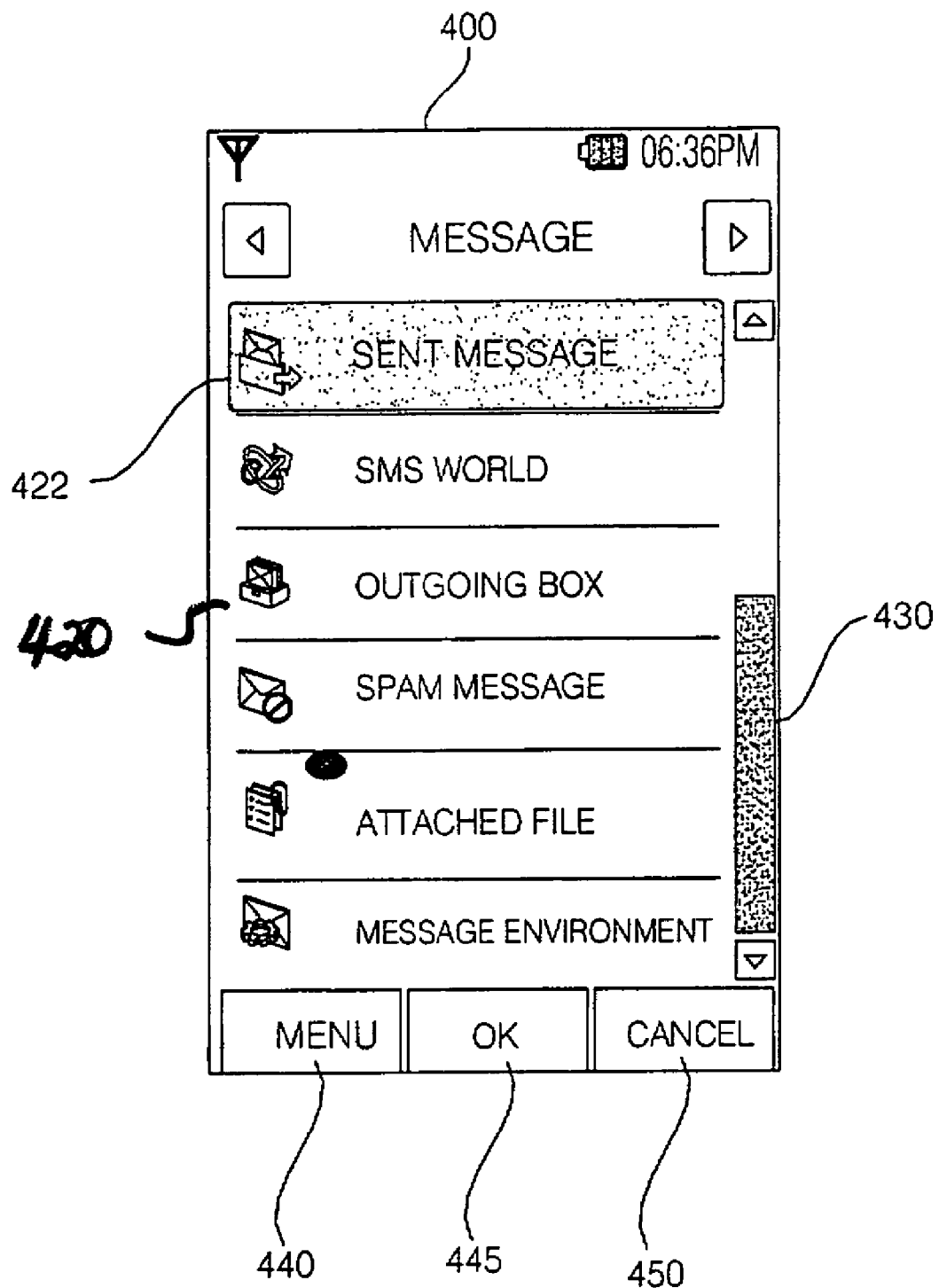
FIG. 8 is an overview illustrating a double touch operation being performed on the touch screen according to an embodiment of the present invention.

Turning next to FIG. 4, which is a flowchart illustrating a method of controlling an operation of a mobile communication device according to an embodiment of the present invention. FIG. 3 will also be referred to in this description. As shown, the method first displays a menu list and corresponding scroll bar (S200) in response to a user's request, for example. That is, the controller 160 displays on the touch screen 120 a menu list including the menu items for the user-selected menu and an associate scroll bar for scrolling the menu list. FIGS. 6-8 illustrate examples of a menu list and associated scroll bar.

Further, the scroll bar can be used when there is more information to view than will fit in a window on the touch screen 120. That is, information displayed on the touch screen 120 may be scrolled vertically or horizontally according to movement of a slider in the scroll bar. Further, as shown in FIG. 4, the controller 160 determines whether the scroll bar displayed on the touch screen 120 has been touched (S205). That is, the controller 160 can determine whether or the scroll bar has been touched and/or what part of the touch screen 120 has been touched based on a signal transmitted by the touch screen 120.

Then, if the controller 160 determines the scroll bar has been touched (yes in S205), the controller 160 determines whether the user has dragged his or her finger (or other pointing device) between the scroll bar and the associated menu list display area where the menu list is displayed. If the controller 160 determines or detects that the user has performed a dragging operation between the scroll bar and the menu list display area (yes in S210), the controller 160 scrolls the menu list according to a direction of the drag operation (S215). In other words, if the user performs a downward dragging operation, the controller 160 scrolls down the menu list. On the contrary, if the user performs an upward dragging operation, the controller 160 scrolls up the menu list. Further, if the scroll bar is a horizontal scroll bar, the controller 160 scrolls the menu list to the left or right based on the direction of the dragging operation performed by the user.

If the controller 160 determines that the user has not performed a dragging operation from the scroll bar to the menu list display area (no in S210), the controller 160 determines whether a slider in the scroll bar has been moved (S220). If the controller 160 determines the slider has been moved (yes in S220), the controller 160 scrolls the menu list according to a direction of the movement of the scroll bar slider (S225). Otherwise, if the controller 160 determines the slider has not been moved (no in S220), the method moves to step S230.

That is, in S230, the controller 160 determines whether one of the menu items included in the menu list has been selected. If a menu item has been selected (yes in S230), the controller 160 executes an operation corresponding to the selected menu item (S235). If a menu item has not been selected (no in S230), the controller 160 determines whether an operation menu item, other than the menu items included in the menu list, has been selected on the touch screen 120. Further, if the controller determines an operation menu item has been selected on the touch screen 120 (yes in S240), the controller 160 executes an operation corresponding to the selected operation menu item (S245). In addition, the above-mentioned scrolling operations are repeatedly performed. Therefore, it is possible to efficiently scroll a menu list displayed on a touch screen in response to the user touching the touch screen.

Figure 5:
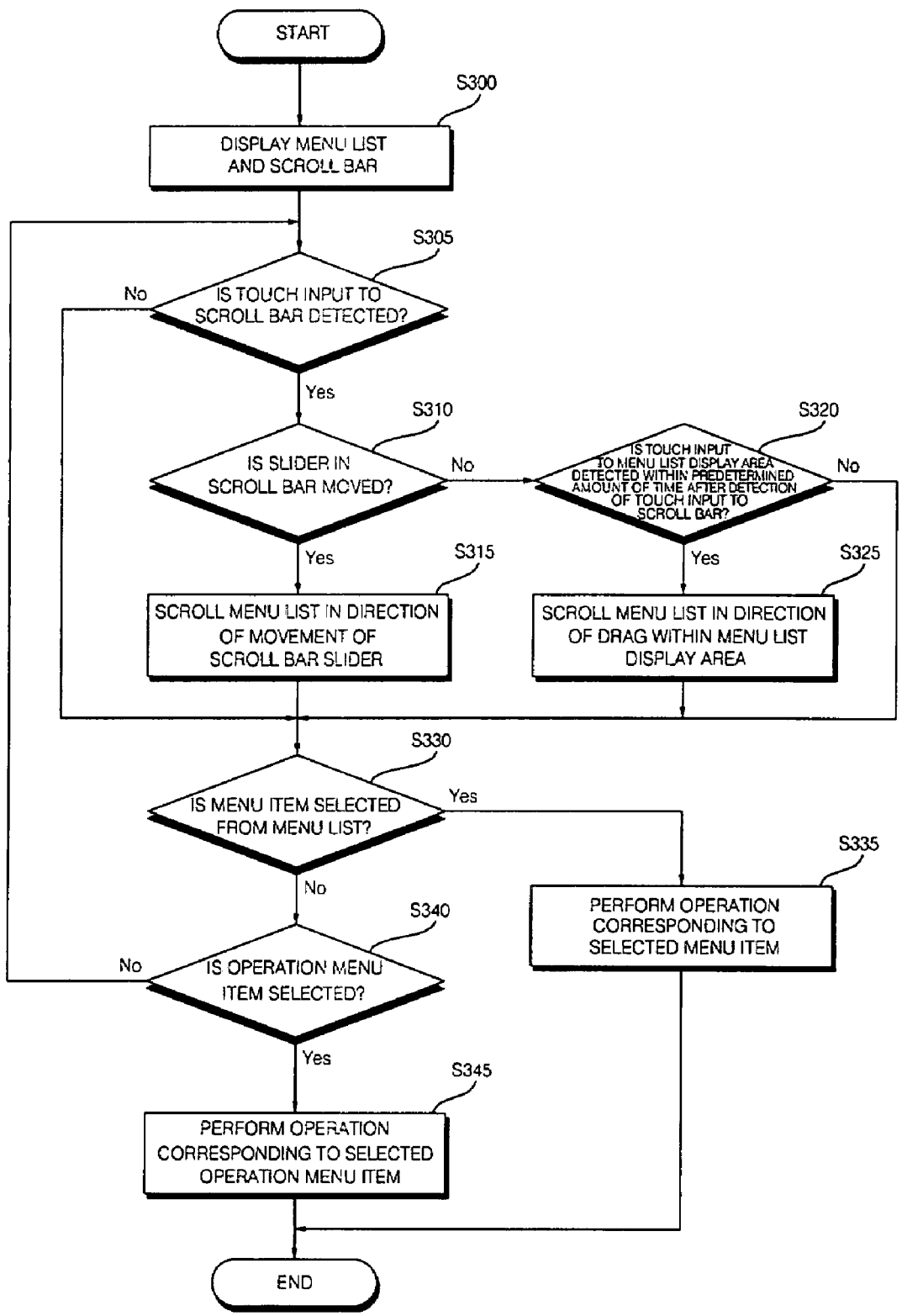
FIG. 5 is a flowchart illustrating a method of controlling an operation of a mobile communication device according to another embodiment of the present invention.

Turning next to FIG. 5, which is a flowchart illustrating a method of controlling an operation of a mobile communication device according to another embodiment of the present invention. The method illustrated in FIG. 5 is different from the method illustrated in FIG. 4, because the method in FIG. 5 scrolls a menu list when the menu list is touched within a predetermined amount of time after the scroll bar is touched. That is, rather than a dragging operation, FIG. 5 relates to a method in which the user first touches the scroll bar and then touches the menu list display area within a predetermined amount of time (e.g., a double touching operation). FIG. 3 will also be referred to in this description.

In more detail, and as shown in FIG. 5, the method displays a menu list and corresponding scroll bar in response to a user's request (S300). The, the controller 160 determines if the user has touched the scroll bar (S305). If the user has touched the scroll bar (yes in S305), the controller 160 determines if the user has moved the slider in the scroll bar (S310). If the user has moved the slider in the scroll bar (yes in S310), the controller 160 scrolls the menu list in the same direction that the user has moved the scroll bar slider.

However, if the controller 160 determines the user has not moved the slider (no in S310), the controller 160 determines if the user has touched the menu list display area within a predetermined amount of time from touching the scroll bar (S320). If the user has touched both of the scroll bar and menu list display area within a predetermined amount of time (yes in S320), the controller 160 scrolls the menu list in the same direction that the user performs a dragging operation (S325).

In addition, the controller also determines if a menu item has been selected from the menu list (S330), and executes a selected menu item (S335). Further, if the controller 160 determines the user has not selected a menu item in step S330, the controller 160 determines if another menu item that is not included in the menu list has been selected (S340), and executes an operation corresponding to the selected operation menu item (S345). The above-mentioned scrolling operations are repeatedly performed. Accordingly, it is possible to scroll a menu list displayed on a touch screen in response to the user touching the touch screen.

Turning now to FIGS. 6-8, which are overviews illustrating touch screens for explaining the methods illustrated in FIGS. 4 and 5. In more detail, FIG. 6 is an overview illustrating a touch screen 400 including a menu list 420 and a vertical scroll bar 430. As shown, the vertical scroll bar 430 includes scroll arrows 431 and 432 and is disposed on the user's right side of the menu list 420. Further, the user can scroll the menu list 420 in an up and down direction using the scroll bar 430. The touch screen 400 also includes a menu name 410 indicating the name of a menu corresponding to the menu list 420. In this example, the menu name is "Message" and the menu items in the menu list 420 includes a plurality of different selectable menu items that the user can select to send a text message, photo, check emails, etc. Further, in this embodiment, the menu name is displayed above the menu list 420, but the menu name can be displayed in other appropriate portions of the touch screen 400.

Further, the touch screen 400 also includes arrows 412 and 413, which the user can use to switch between different menus. As shown, the touch screen 400 further includes operation menu items/buttons such as the 'MENU' button 440, the 'OK' button 445, and the 'CANCEL' button 450 displayed below the menu list 420. In addition, the reference numeral 422 in FIG. 6 refers to a currently selected menu item (i.e., the "sent message" menu item). In addition, rather than the vertical scroll bar 430 in FIG. 6, a horizontal or other directional scroll such as a circular or semi-circular scroll bar may be used. For example, a horizontal scroll bar may be displayed above or below the menu list 420 and scroll the menu list 420 horizontally (assuming the menu items in the menu list 420 were also disposed horizontally). In addition, the reference numeral 435 in FIG. 6 indicates the user touching the scroll bar 430.

In more detail, FIG. 7 is an overview illustrating a user touching the scroll bar 430 at the location 435 and then performing a dragging operation from the scroll bar 431 into the menu list 420. That is, the trajectory 437 results from the user touching the location 435 on the scroll bar 430, horizontally dragging his or her finger (or other pointer) from the scroll bar 430 to the menu list 420 and then downwardly dragging his or her finger within the menu list 420. Thus, in this example, the controller 160 determines the touch and drag operation and scrolls the menu list 420 in a downward direction (i.e., in the same direction as the user drags his or her finger). FIG. 7 also illustrates the menu button 440, ok button 445 and cancel button 450.

Next, FIG. 8 illustrates the menu list 420 having been scrolled downwards from the operation performed in FIG. 7. That is, the menu items in the menu list 420 on the touch screen 400 have been scrolled downwards to so that one or more new menu items other than those previously displayed in the menu list 420 are displayed. For example, the menu items "outgoing box," "spam message," "attached file," and "message environment" that were not previously displayed are now displayed due to the scrolling operation. Further, the "sent message" menu item 422 has been around the menu list to appear on a top portion of the list.

In addition, the currently selected menu item 422 (which is highlighted) can be executed by selecting the OK button 445. The user can also execute a particular menu item by touching and holding their finger on the respective menu item, by double touching the respective menu item, etc. The user can also select another menu item by touching that particular menu item. Further, FIG. 8 also illustrates the situation in which the user first touches the scroll bar 430 (the location of the touch on the scroll bar 430 is not shown in FIG. 8), and then touching one of the menu items (i.e., position 434 in FIG. 8) in the menu list 420 with a predetermined amount of time. That is, the user performs a double touching operation rather than a touch and drag operation. Thus, the user can scroll the menu items by moving the touched location 343 in an upward or downward direction (as discussed in FIG. 5).

Further, the above-description refers to a menu list being displayed on a touch screen and scrolled based on touching operations performed by a user. However, the present invention is not limited to menu items contained within a menu list, but also applied to any other information that can be scrolled.

In addition, FIGS. 6-8 illustrate the scroll bar on left side of the menu list (the user's right side). However, the scroll bar may be positioned on the right side, top or bottom of the menu list. A circular scroll bar may also be implanted when the menu list is displayed as a dial or circular shape.

In addition, in the above-described embodiments, the controller 160 preferably highlights the scroll bar when it is touched. Therefore, the user can easily confirm that the controller 160 has recognized the scroll bar has been touched. Further, the controller 160 also scrolls the menu list when the scroll bar is highlighted and the dragging operation is performed within the menu list.

As described above, according to the present invention, it is possible to scroll a menu list displayed on a touch screen, using a scroll bar displayed on the touch screen, in response to touch input to the touch screen. Therefore, it is possible to efficiently control an operation of a mobile communication device using even a small-sized touch screen.

Further, the present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meters and bounds of the claims, or equivalence of such meters and bounds are therefore intended to be embraced by the appended claims.

What is claimed is:

1. A method of controlling a mobile communication device, the method comprising:
    displaying a menu list and a scroll bar for scrolling the menu list on a touch screen of the terminal;
    receiving a first touching signal indicating a touching of the scroll bar;
    receiving a second touching signal indicating a touching and dragging operation has been performed from the scroll bar directly to the menu list;
    receiving a direction signal indicating a direction in which the touching and dragging operation is performed within the menu list; and
    scrolling the menu list in a same direction as the indicated direction in the direction signal only after receiving the second touching signal.

2. The method of claim 1, further comprising:
    receiving a touch signal indicating a menu item in the menu list has been touched.

3. The method of claim 2, further comprising:
    performing an operation corresponding to the touched menu item when the touch signal is received and an activation button is touched.

4. The method of claim 2, further comprising:
    performing an operation corresponding to the touched menu item when the touch signal is received and when the touched menu item is released from being touched.

5. The method of claim 1, wherein the displaying step further displays a name of a menu corresponding to the menu list on the touch screen.

6. The method of claim 1, wherein the scrolling step is performed to display a hidden menu item in the menu list, and
    wherein the hidden menu item is selected by touching the hidden menu list after the scrolling step displays the hidden menu item as a non-hidden menu item.

7. The method of claim 1, wherein the touching and dragging operation includes horizontally dragging a pointer from the scroll bar to the menu list and then vertically dragging the pointer up or down in the menu list.

8. A method of controlling a mobile communication device, the method comprising:
    displaying a menu list and a scroll bar for scrolling the menu list on a touch screen of the terminal;
    receiving a double touch signal indicating if a double touching operation has been performed on the touch screen in which the double touching operation includes a first touching signal indicating the scroll bar has been touched and a second touching signal indicating the menu list has been touched;
    receiving a direction signal indicating a direction in which a dragging operation is performed within the menu list; and
    scrolling the menu list in a same direction as the indicated direction in the direction signal only after receiving the second touching signal.

9. The method of claim 8, wherein the received double touch signal indicates if the double touching operation has been performed within a predetermined amount of time, and
    wherein the scrolling step scrolls the menu list when the received double touch signal indicates the double touching operation has been performed within the predetermined amount of time.

10. The method of claim 8, further comprising:
    highlighting the scroll bar after receiving the first touching signal indicating the scroll bar has been touched,
    wherein the scrolling step scrolls the menu list when the scroll bar is highlighted and the dragging operation is performed within the menu list.

11. The method of claim 8, further comprising:
    receiving a touch signal indicating if a menu item in the menu list has been touched.

12. The method of claim 11, further comprising:
    performing an operation corresponding to the touched menu item when the touch signal is received and an activation button is touched.

13. The method of claim 11, further comprising:
    performing an operation corresponding to the touched menu item when the touch signal is received and when the touched menu item is released from being touched.

14. The method of claim 8, wherein the displaying step further displays a name of a menu corresponding to the menu list on the touch screen.

15. The method of claim 8, wherein the scrolling step is performed to display a hidden menu item in the menu list, and
    wherein the hidden menu item is selected by touching the hidden menu list after the scrolling step displays the hidden menu item as a non-hidden menu item.

16. A mobile communication device, comprising:
    a display including a touch screen and configured to display a menu list and a scroll bar for scrolling the menu list on the touch screen; and
    a controller configured to receive a first touching signal indicating a touching of the scroll bar and a second touching signal indicating a touching and dragging operation has been performed from the scroll bar directly to the menu list, to receive a direction signal indicating a direction in which the dragging operation is performed within the menu list, and to scroll the menu list in a same direction as the indicated direction in the direction signal only after receiving the second touching signal.

17. The mobile communication device of claim 16, wherein the controller further receives a touch signal indicating if a menu item in the menu list has been touched.

18. The mobile communication device of claim 17, wherein the controller performs an operation corresponding to the touched menu item when the touch signal is received and an activation button is touched.

19. The mobile communication device of claim 17, wherein the controller performs an operation corresponding to the touched menu item when the touch signal is received and when the touched menu item is released from being touched.

20. The mobile communication device of claim 16, wherein the controller displays a name of a menu corresponding to the menu list on the touch screen.

21. The mobile communication device of claim 16, wherein the controller scrolls the menu list to display a hidden menu item in the menu list, and
wherein the hidden menu item is selected by touching the hidden menu list after the controller scrolls the hidden menu item to be displayed as a non-hidden menu item.

22. The mobile communication device of claim 16, wherein the touching and dragging operation includes horizontally dragging a pointer from the scroll bar to the menu list and then vertically dragging the pointer up or down in the menu list.

23. A mobile communication device, comprising:
a display including a touch screen and configured to display a menu list and a scroll bar for scrolling the menu list on the touch screen; and
a controller configured to receive a double touch signal indicating if a double touching operation has been performed on the touch screen in which the double touching operation includes a first touching signal indicating the scroll bar has been first touched and second touching signal indicating the menu list has been touched touched, to receive a direction signal indicating a direction in which a dragging operation is performed within the menu list, and to scroll the menu list in a same direction as the indicated direction in the direction signal only after receiving the second touching signal.

24. The mobile communication device of claim 23, wherein the received double touch signal indicates if the double touching operation has been performed within a predetermined amount of time, and
wherein the controller scrolls the menu list when the received double touch signal indicates the double touching operation has been performed within the predetermined amount of time.

25. The mobile communication device of claim 23, wherein the controller highlights the scroll bar when the received double touch signal indicates the scroll bar has been touched and scrolls the menu list when the scroll bar is highlighted and the dragging operation is performed within the menu list.

26. The mobile communication device of claim 23, wherein the controller scrolls the menu list in a same direction as the indicated direction in the direction signal.

27. The mobile communication device of claim 23, wherein the controller further receives a touch signal indicating if a menu item in the menu list has been touched.

28. The mobile communication device of claim 27, wherein the controller performs an operation corresponding to the touched menu item when the touch signal is received and an activation button is touched.

29. The mobile communication device of claim 27, wherein the controller performs an operation corresponding to the touched menu item when the touch signal is received and when the touched menu item is released from being touched.

30. The mobile communication device of claim 23, wherein the controller displays a name of a menu corresponding to the menu list on the touch screen.

31. The mobile communication device of claim 23, wherein the controller scrolls the menu list to display a hidden menu item in the menu list, and
wherein the hidden menu item is selected by touching the hidden menu list after the controller scrolls the hidden menu item to be displayed as a non-hidden menu item.

* * * * *